(12) United States Patent
Tokasz et al.

(10) Patent No.: US 6,834,648 B2
(45) Date of Patent: Dec. 28, 2004

(54) VALVE MANIFOLD ASSEMBLY FOR OXYGEN MASK DISPENSING CONTAINER

(75) Inventors: Scott J. Tokasz, Orchard Park, NY (US); Jeffrey M. Sabin, Lewiston, NY (US)

(73) Assignee: AVOX Systems Inc., Lancaster, NY (US)

(*) Notice: Subject to any disclaimer, the term of this patent is extended or adjusted under 35 U.S.C. 154(b) by 46 days.

(21) Appl. No.: 10/347,026

(22) Filed: Jan. 17, 2003

(65) Prior Publication Data

US 2003/0154982 A1 Aug. 21, 2003

Related U.S. Application Data

(60) Provisional application No. 60/349,679, filed on Jan. 17, 2002.

(51) Int. Cl.$^7$ .................................................. A62B 9/02
(52) U.S. Cl. .......................... 128/205.24; 244/118.5
(58) Field of Search ................. 128/202.27, 205.24, 128/206.27, 200.24, 204.18, 204.26, 204.27, 204.29; 244/118.5; 206/216

(56) References Cited

U.S. PATENT DOCUMENTS

| | | | | |
|---|---|---|---|---|
| 3,073,301 A | * | 1/1963 | Hay et al. ............... | 128/205.24 |
| 3,351,089 A | * | 11/1967 | Garrahan ............... | 137/599.04 |
| 3,503,394 A | | 3/1970 | Hotz et al. | |
| 4,154,237 A | | 5/1979 | Courter | |
| 4,182,366 A | * | 1/1980 | Boehringer .............. | 137/510 |
| 4,251,053 A | | 2/1981 | Wurzer | |
| 4,378,011 A | | 3/1983 | Warncke et al. | |
| 4,481,945 A | | 11/1984 | Levine | |
| 4,559,939 A | | 12/1985 | Levine et al. | |
| 4,597,412 A | | 7/1986 | Stark | |
| 4,608,976 A | | 9/1986 | Suchy | |
| 4,609,166 A | * | 9/1986 | Brennan ................... | 244/118.5 |
| 4,625,721 A | | 12/1986 | Levine et al. | |
| 4,909,247 A | | 3/1990 | Terrisse et al. | |
| 5,078,343 A | * | 1/1992 | Howlett .................... | 244/118.5 |
| 5,103,854 A | | 4/1992 | Bailey et al. | |
| 5,127,430 A | | 7/1992 | Powers et al. | |
| 5,127,625 A | | 7/1992 | Kleinhappl | |
| 5,301,665 A | | 4/1994 | Jumpertz et al. | |
| 5,419,924 A | | 5/1995 | Nagashima et al. | |
| 5,820,105 A | | 10/1998 | Yamaji et al. | |
| 5,937,886 A | | 8/1999 | Girard et al. | |
| 5,947,415 A | * | 9/1999 | Werjefelt ................. | 244/118.5 |
| 6,073,630 A | | 6/2000 | Adahan | |
| 6,082,398 A | | 7/2000 | Girard et al. | |
| 6,082,673 A | * | 7/2000 | Werjefelt ................. | 244/118.5 |
| 6,089,230 A | | 7/2000 | Barker et al. | |
| 6,123,320 A | | 9/2000 | Rasanow et al. | |
| 6,336,667 B1 | | 1/2002 | Ford et al. | |
| 6,634,356 B1 | * | 10/2003 | O'Dea et al. .......... | 128/204.25 |
| 6,644,313 B2 | * | 11/2003 | Prime et al. ........... | 128/205.24 |

FOREIGN PATENT DOCUMENTS

| | | | | |
|---|---|---|---|---|
| WO | WO 00/13731 | * | 3/2000 | ............ 128/204.25 |
| WO | WO 01/69111 A1 | | 9/2001 | |

* cited by examiner

*Primary Examiner*—Henry Bennett
*Assistant Examiner*—Andrea M. Ragonese
(74) *Attorney, Agent, or Firm*—Hodgson Russ LLP

(57) ABSTRACT

A valve manifold assembly with a valve body having at least one inlet and at least one outlet. The outlet has an opening disposed inside a chamber formed in the valve body. The valve body has at least one groove defined therein. A valve member is attached to the valve body. A retaining member is disposed in at least one groove in the valve body so that the retaining member engages with the valve member to cause it to sealingly engage with the outlet opening. The retaining member is capable of being removed from the groove such that it no longer engages with the valve member and it causes the valve member to disengage from the outlet opening.

21 Claims, 5 Drawing Sheets

VALVE MANIFOLD ASSEMBLY FOR OXYGEN MASK DISPENSING CONTAINER

CROSS-REFERENCE TO RELATED APPLICATION

Applicant hereby claims priority based on U.S. Provisional Patent Application No. 60/349,679 filed Jan. 17, 2002, entitled "Valve Manifold Assembly for Oxygen Mask Dispensing Container" which is incorporated herein by reference.

FIELD OF THE INVENTION

The invention relates to an assembly for deploying an emergency breathing mask in an aircraft.

BACKGROUND OF THE INVENTION

Many aircraft are required to provide passengers and crew members in the pressurized cabin with an emergency breathing mask in the event of a sudden loss of cabin pressure due to a rupture in the cabin wall or to a failure in the aircraft's pressurizing system. The conventional emergency breathing mask is typically stowed in an overhead storage container directly over the user. Upon a sudden loss of cabin pressure, the container door automatically opens and the mask is deployed by gravity to the user. The mask typically hangs from the open container in the vicinity of the user, but the flow of breathing gas to the mask is not automatically activated. Because the mask may drop over an empty seat, it is desirable to have a user activated valve that controls the flow of breathing gas to the mask. It has been known to provide a lanyard that is connected between the breathing gas conduit and a valve in the container such that when the mask is pulled toward the face of the user, the tension on the lanyard opens a valve to allow breathing gas to flow to the mask. An example is disclosed in U.S. Pat. No. 4,909,247 which is incorporated herein by reference.

What is needed is an improved valve manifold assembly.

SUMMARY OF THE INVENTION

The present invention meets the above-described need by providing a valve manifold assembly with a valve body having at least one inlet and at least one outlet. The outlet has an opening disposed inside a chamber formed in the valve body. The valve body has at least one groove defined therein. A valve member is attached to the valve body. A retaining member is disposed in at least one groove in the valve body so that the retaining member engages with the valve member to cause it to sealingly engage with the outlet opening. The retaining member is capable of being removed from the groove such that it no longer engages with the valve member and it causes the valve member to disengage from the outlet opening.

BRIEF DESCRIPTION OF THE DRAWING

The invention is illustrated in the drawings in which like reference characters designate the same or similar parts throughout the figures of which:

FIG. 4 is a cross-sectional view of the valve manifold assembly of the present invention with the element in the middle of the figure having a seal and a retaining disk disposed such that the valve is in the closed position; and, FIG. 5 is a partial cross-sectional view showing one element of the valve manifold assembly disposed in the open position with the retaining disk removed there from.

DETAILED DESCRIPTION

Figure 1:
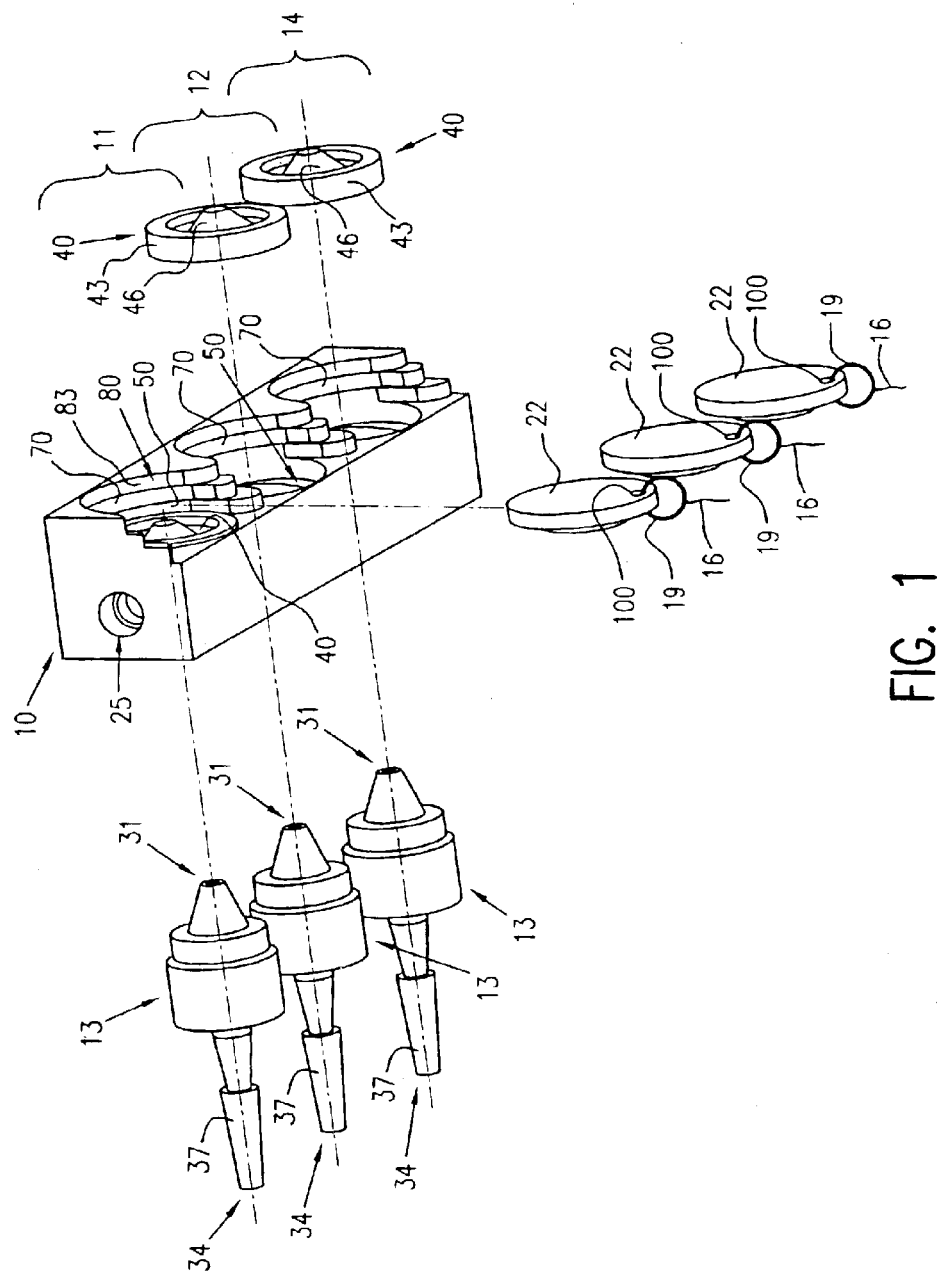
FIG. 1 is an exploded perspective view of the valve manifold assembly of the present invention.

Referring to FIGS. 1–5 generally and initially to FIG. 1, a valve body 10 engages with three adapters 13 for supplying breathing gas to three breathing conduits attached to passenger oxygen masks (not shown). The valve body 10 is sized to be disposed inside a passenger oxygen mask dispensing container (not shown) which is typically mounted in the interior lining of an aircraft above the passenger seats. The valve body 10 may be constructed out of metal or plastic and can be formed by any suitable process such as molding, machining or casting.

Although, the invention is shown with three individual valves 11, 12, 14 disposed in a single block, passenger oxygen mask dispensing containers may contain any number of individual passenger oxygen masks requiring individual valves. Each of the valves shown in the drawings function identically with the only difference being the positioning within the valve body 10. In order to provide additional lines for a greater numbers of masks, the valve body 10 can be connected to another valve body 10 or the valve body 10 could be made longer with additional valves added in series. If the valve body 10 is connected to another valve body 10, they can be placed side-by-side, at an angle to each other, or they can be spaced apart. The valve bodies 10 can be disposed in a single mask dispensing container or disposed in separate mask dispensing containers and connected by conduits. The valve body 10 may be designed to provide any number of valves including a single valve with a single outlet.

When an event occurs in the aircraft that requires breathing gas to be provided to the passengers, the lid or door (not shown) of the oxygen mask dispensing container is automatically released. The door or lid may be released by an electrically actuated solenoid, a gas pressure activated piston, or the like. As known to those of ordinary skill in the art, the device for opening the door such as a spring-biased piston may be incorporated into valve body 10 or may be standalone. If it is incorporated into the valve body 10, one of the positions where a valve is disposed can be replaced with a spring-biased piston that can be actuated by gas pressure. Once the door or lid opens, the masks drop down and hang from lanyards under the force of gravity. The lanyards are typically disposed such that force on the lanyard is required to pull the mask to the user's face. This force from the user pulling on the mask during deployment is used to open a valve to allow the breathing gas to flow to the mask. These type of systems are known in the art and are disclosed in U.S. Pat. Nos. 3,503,394 and 4,909,247 which are incorporated herein by reference.

Figure 3:
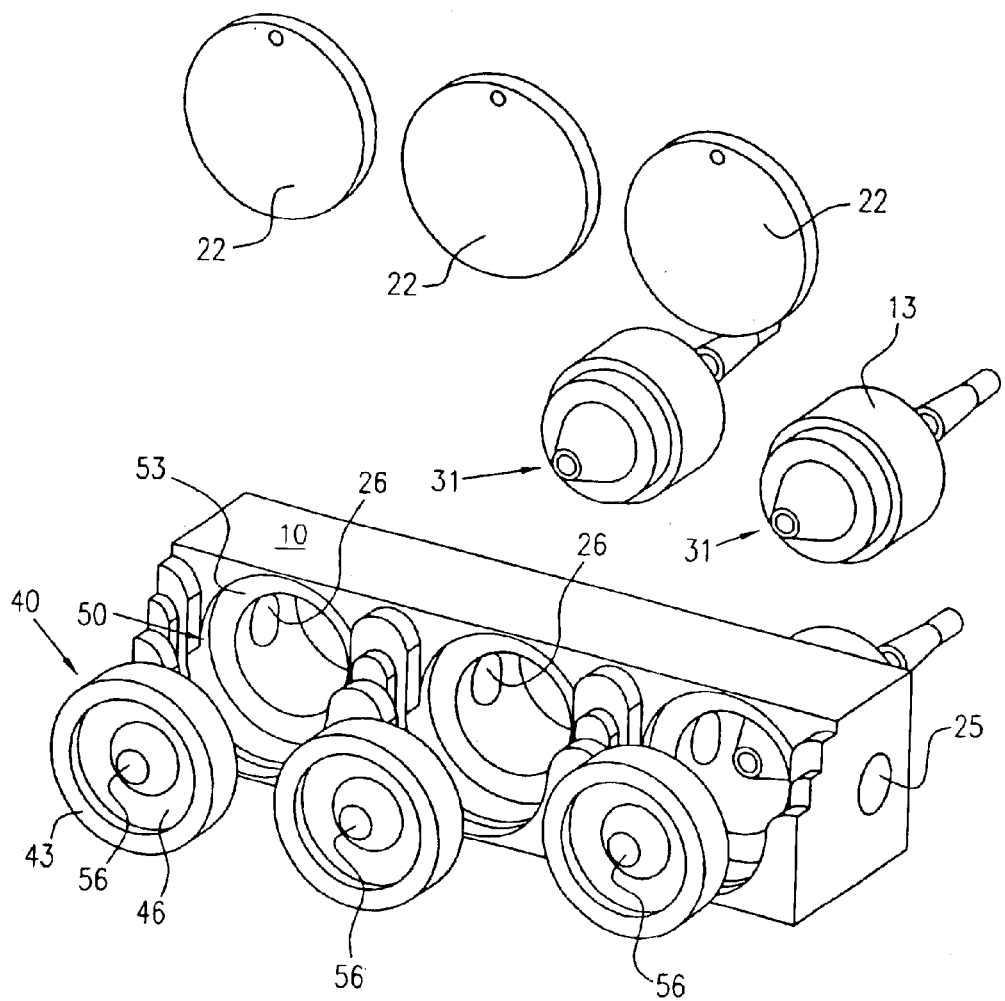
FIG. 3 is another exploded perspective view of the valve manifold assembly.

In FIG. 1, a user pulled lanyard 16 is attached by a ring 19 or other attachment means to a retaining disk 22 that engages with the valve body 10 as will be described in detail herein. The lanyard 16 could also be connected directly to the opening 100 in the disk 22. A valve member 40 is disposed in the valve body 10 and seats against an inlet 31 on the adapter 13 as described in greater detail below. Each end of the valve body 10 may be provided with an inlet 25 for attachment of the breathing gas line (not shown) that may be supplied from a breathing gas source (not shown). The inlet 25 shown is a female port, however as known to those of ordinary skill in the art, the inlet 25 could also be configured as a male port. A series of openings 26 are disposed through the valve body 10 as shown in FIG. 3. The openings 26 allow for breathing gas to pass through the valve body 10.

The adapters 13 have an inlet 31 that is shaped in the form of a truncated cone. The inlet 31 is shaped so that a soft elastomeric seal can seat against the inlet 31 when the valve is closed. Other shapes for the inlet 31 may also be suitable. At the opposite end, the adapters 13 have an outlet 34 with a hose connector 37 for connecting the conduit (not shown) that carries the breathing gas to the mask. The connector 37 is a barb type connector, however, other shapes and connectors 37 as known to those of skill in the art would also be suitable. Other types and shapes of hose connectors would also be suitable. For example, as will be evident to those of ordinary skill in the art, additional hose connectors 37 may be connected to the flow actuation valve 11, 12 or 14 so that a single flow actuation valve can distribute breathing gas to a plurality of masks through a plurality of conduits. As will also be evident to those of ordinary skill in the art, if multiple masks are supplied through a single flow actuation valve 11, 12, or 14 then the respective lanyards 16 would each be connected to a single retaining member 22. Accordingly, the present invention may function with a flow actuation valve for every mask or may function with multiple masks connected to a single flow actuation valve. When multiple masks are connected to a single flow actuation valve, breathing gas may be allowed to flow to a mask deployed over an empty seat.

Figure 4:
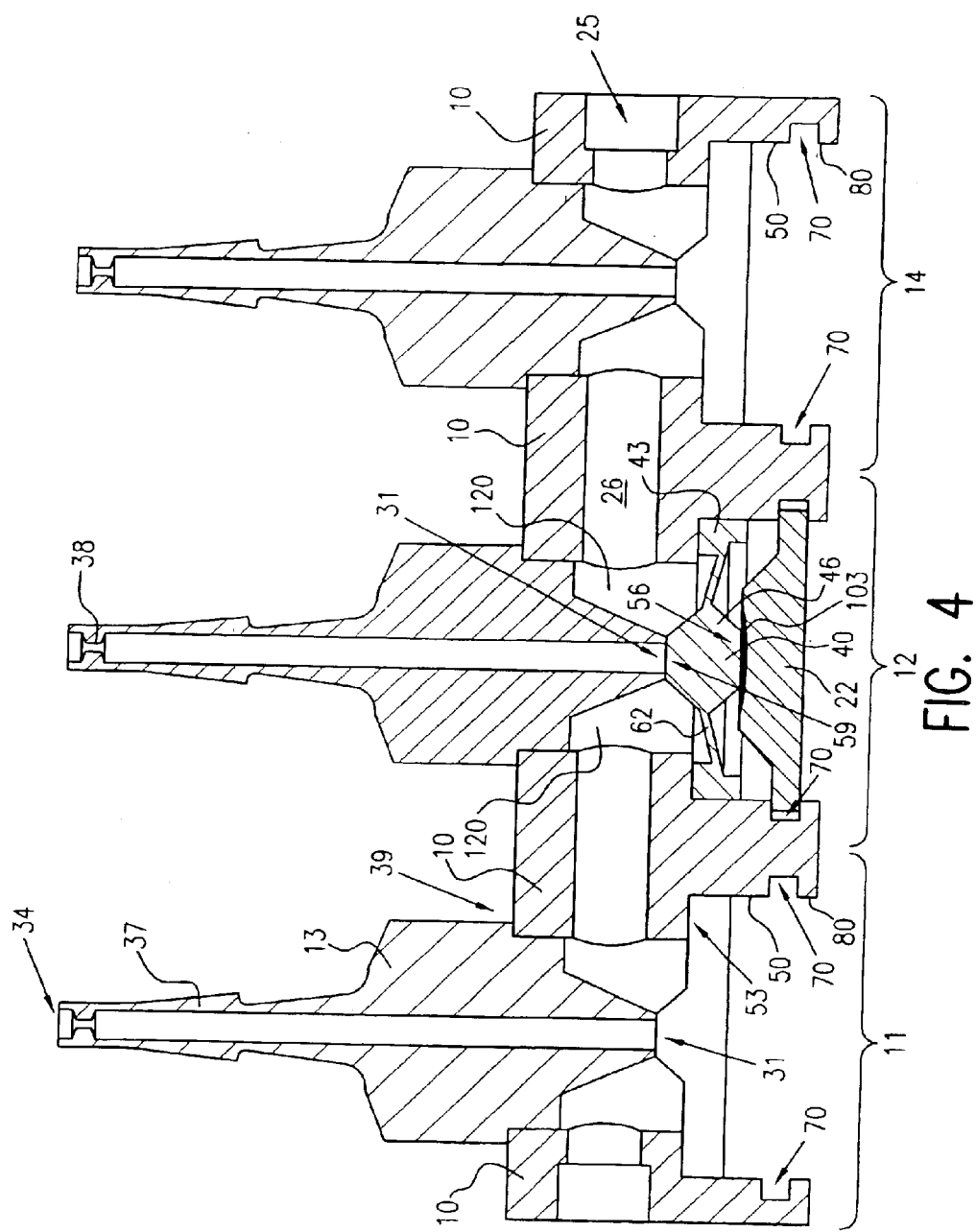
Figure 5:
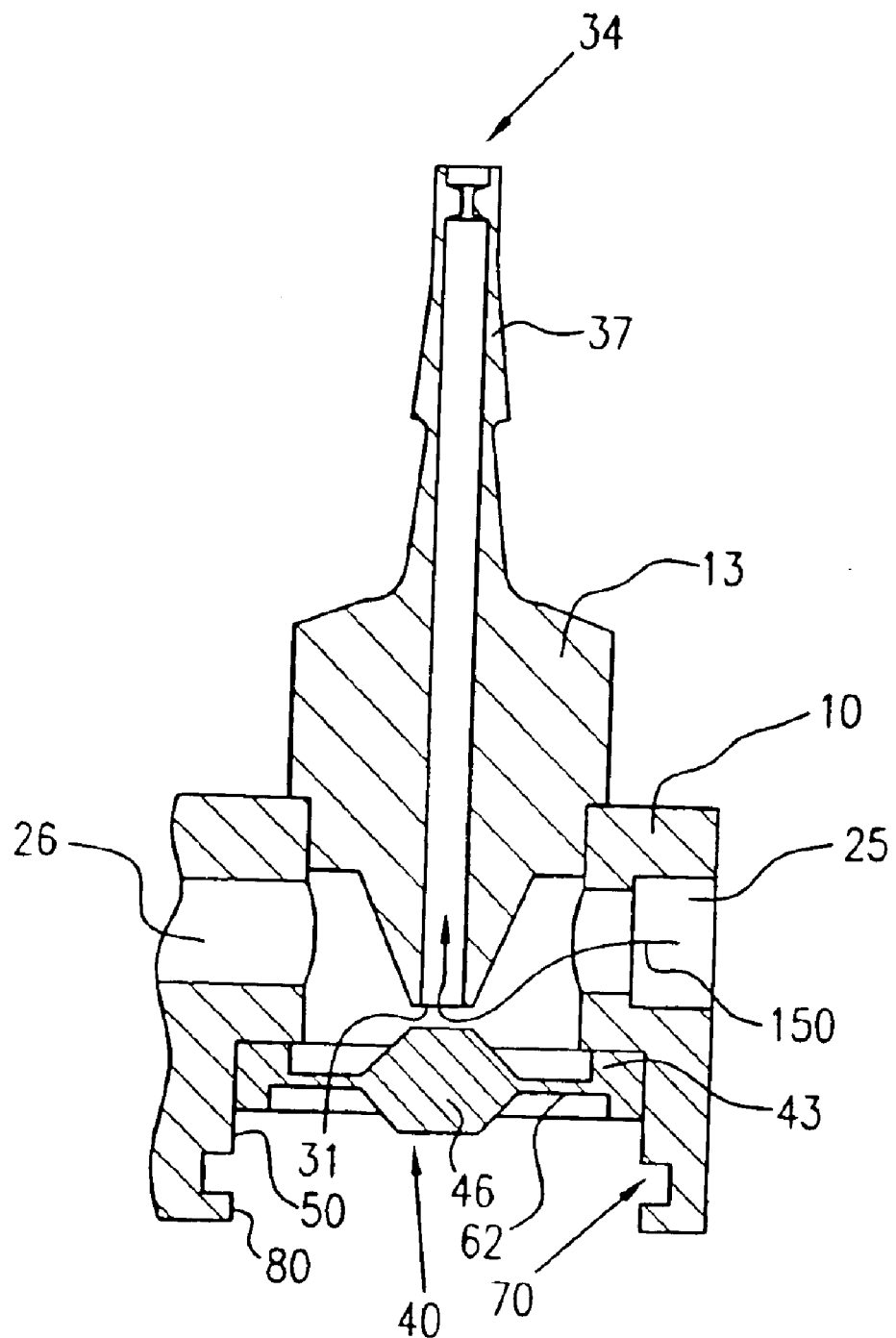

If a calibrated orifice is provided, the calibrated orifice 38 (FIG. 4) may be located on the connector 37 or the calibrated orifice can be located somewhere else. The adapters 13 engage with the valve body 10 as best shown in FIGS. 4 and 5. The adapters 13 may be attached to the valve body 10 through opening 39 (FIG. 2) by a threaded engagement, a quarter turn bayonet engagement, a solvent bond, a set of pipe threads, an adhesive, or the like. It is also possible to mold the valve body 10 and the adapter 13 as one part with the adapter 13 formed integrally in the valve body 10.

The valve member 40 may comprise a disk 43 supporting an elastomeric seal 46. The seal 46 may be molded from a suitable elastomer such as silicone. The disk 43 may be formed out of any suitable material such as metal, plastic, or the like. As shown the seal 46 is supported from the perimeter edges of the disk 43. If additional support for the elastomer seal is needed in the center opening, the disk 43 may be formed in the shape of a "wagon wheel" type arrangement with some spokes extending across the opening. In the wagon wheel type arrangement, the elastomer is molded over or around the spokes. As an alternative, the valve member 40 may comprise a thin metal member covered by an elastomer. The thin metal member may be solid or perforated and would alternate between a convex and a concave configuration depending on the force exerted on the opposite side of the member. The member would be biased in the open position based on the spring properties of the metal. Depending on whether the disk 22 is engaged with the member, the thin metal member would "pop" from one configuration to the other.

The valve member 40 fits into an opening 50 (FIG. 3) in the valve body 10. As best shown in FIG. 4, the opening 50 has a shoulder 53 formed at the bottom of the opening 50 to provide support and to seal the outside of the valve member 40 against the valve body 10 so that gas cannot escape around the valve member 40. In FIG. 4, the valve member 40 and retaining disk 22 have been removed from the outer positions for clarity. The middle position in FIG. 4 shows the valve 12 with the valve member 40 and the retention disk 22 in the closed position. The elastomeric portion of the valve member 40 may be provided with frustoconical surfaces 56, 59 on opposite sides for engaging with the inlet 31 on the adapter 13 and for engaging with the retaining disk 22 as described in greater detail hereafter. The valve member 40 may be sealingly attached inside the opening in the valve body 10 in many different ways as known to those of ordinary skill in the art. The valve member 40 could be pressed in, attached by threaded members, or the like. The seal between the outside of the valve member 40 and the valve body 10 can be a face seal or could be provided by O-rings (not shown). In FIG. 4, a reduced thickness section 62 may extend from the outside of the valve member 40 toward the middle where the surfaces 56 and 59 are disposed.

Returning to FIGS. 1 and 4, a groove 70 having a round surface is disposed in the valve body 10. The groove 70 is disposed between an outer surface 80 of the valve body 10 and the opening 50 that receives the retention disk 22. The outer surface 80 also has a rounded opening 83. The rounded opening 83 makes it easier to install the valve member 40, however, the opening 83 may take other shapes.

The groove 70 has a round surface in order to provide for rotation of the retaining disk 22 inside the groove 70. The round groove 70 allows the disk 22 to rotate into substantial alignment with the direction of the force on the user pulled lanyard 16 to make it easier to pull the disk 22 out of the groove 70. The rotation of the disk 22 is typically needed because the force on the user pulled lanyard 16 may be transmitted from different angles depending on the location of the passenger seat relative to the oxygen mask dispensing container, the height of the passenger, and the angle at which they pull on the lanyard 16.

Figure 2:
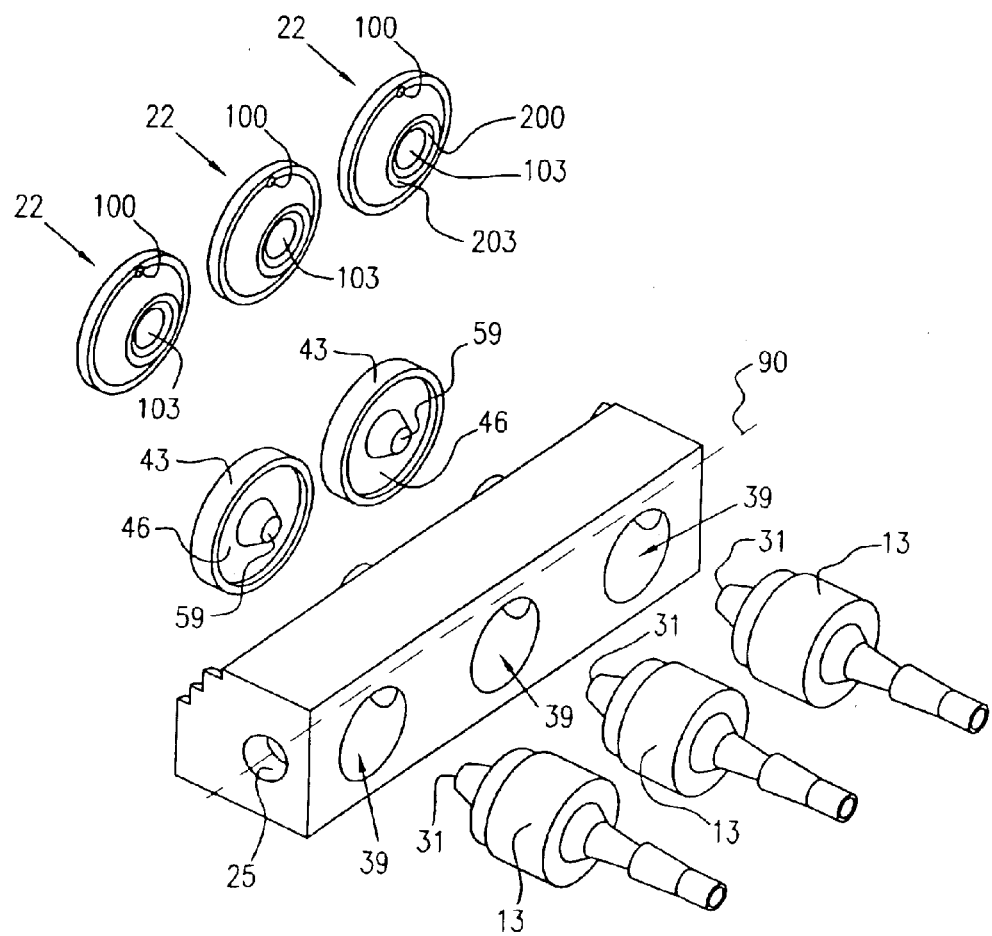
FIG. 2 is another exploded perspective view of the valve manifold assembly.

It is also possible for the entire valve body 10 to rotate about an axis 90 (FIG. 2). The valve body 10 could be supported from the breathing gas conduits and rotate about the conduits by means of O-rings or bearings.

It is also possible to eliminate the rotation of the disk 22 by guiding the lanyard 16 through an eye, a pulley or other mechanical arrangement for causing the lanyard to be held at a fixed angular position relative to disk 22.

Although the disk 22, the valve member 40 and the groove 70 are provided as round members in the example shown, these elements could be any other suitable shape. If it is not necessary for the disk 22 to rotate in groove 70, for example, if the entire valve body 10 rotates as described above, the groove 70 could be made in any other suitable shape such as a square, rectangle, triangle, or the like. Accordingly, the disk 22 would also take on a different shape to mate with the groove 70. The embodiment shown with round elements is an example of one embodiment of the present invention and is not intended to limit the invention to the round configuration.

The retention disks 22 have openings 100 for receiving the ring 19 that attaches to the user pulled lanyard 16. As best shown in FIG. 2, one side of the retention disk 22 may be provided with a centrally disposed recessed portion 103. When the retention disk 22 is disposed inside the valve body 10 as shown in FIG. 4, the frustoconical surface 56 on the valve member 40 engages with the recessed portion 103. As a result, the retaining disk 22 and the valve member 40 can be held together by a frictional fit. This frictional fit must be overcome by the force on the lanyard 16 to remove the retention disk 22 from engagement with the valve member 40. The frictional fit also prevents the valve from being inadvertently opened due to environmental conditions such as shock and vibration. As shown in FIG. 2, recessed portion 103 may be provided with a curved transition section 200 extending to surface 203. The curved section 200 may be conical or radiused. Alternately, if the recess is relatively shallow, section 200 may be formed as a straight wall. As shown in the middle of FIG. 4, when the retention disk 22 is inserted into groove 70 in the valve body 10, the recessed portion 103 engages with the frustoconical surface 56 and deflects the seal 46 so that it seats against the outlet 31 on the adapter 13. As shown the reduced thickness section 62 is deflected toward the adapter 13 by the disk 22.

Turning to FIG. 5, when the disk 22 is removed, the seal 46 moves away from its seat on the inlet 31 and breathing gas is allowed to pass through passageway 26 into the inlet 31 as indicated by arrow 150 in FIG. 5 where it flows to outlet 34. The seal 46 may move away from inlet 31 due to one or more of the following: relaxation of the elastomer after the force from the retention disk 22 is removed, the pressure of the gas against valve member 40, or the spring properties of the metal if the thin metal member is used in the valve member 40 as described above.

Returning to FIG. 2, the inside of the valve body 10 includes a round chamber that is open around the adapter 13 such that if the valve member 40 in the middle position for valve 12 is closed but the valve member 40 in the outer position of valve 11 is opened then the gas can flow around the adapter 13 to the outer position as indicated by arrow 120 in FIG. 4.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A valve manifold assembly for use with an oxygen mask dispensing container having a user pulled lanyard, the lanyard capable of transmitting force in a direction toward the user during deployment, the valve manifold assembly comprising:
    a valve body having at least one inlet and at least one outlet, the outlet having an opening disposed inside a chamber formed in the valve body, the valve body having at, least one arcuate groove defined therein;
    a valve member attached to the valve body; and,
    a rotatable retaining member disposed in the at least one groove in the valve body so that the retaining member engages with the valve member to cause the valve member to sealingly engage with the outlet opening, the retaining member capable of rotating into substantial alignment with the direction of force on the user pulled lanyard, the retaining member capable of being removed from the groove such that it no longer engages with the valve member and causes the valve member to disengage from the outlet opening.

2. The valve manifold assembly of claim 1, wherein the outlet comprises an adapter capable of removably attaching to the valve body.

3. The valve manifold assembly of claim 1, wherein the outlet comprises an integrally formed adapter leading to a breathing conduit.

4. The valve manifold assembly of claim 1, wherein the outlet opening is shaped in the form of a truncated cone.

5. The valve manifold assembly of claim 1, wherein the valve member is a solid disk.

6. The valve manifold assembly of claim 1, wherein the valve member includes a reticulated structure.

7. The valve manifold assembly of claim 1, wherein the valve member comprises a thin metal member covered by an elastomer.

8. The valve manifold assembly of claim 7, wherein the metal member is capable of alternating between a concave and a convex orientation.

9. The valve manifold assembly of claim 1, wherein the retaining member has a recessed portion.

10. The valve manifold assembly of claim 1, wherein the valve member further comprises a reduced thickness section capable of deflecting toward the outlet opening when the retaining member engages the valve member.

11. A valve manifold assembly for use with an oxygen mask dispensing container having a user pulled lanyard, the lanyard capable of transmitting force in a direction toward the user during deployment, the valve manifold assembly comprising:
    a valve body having at least one inlet and at least one outlet, the valve body having a chamber defined therein, the outlet having a first opening disposed inside the chamber, the valve body having a second opening with at least one arcuate groove disposed adjacent to the second opening;
    a valve member attached to the valve body adjacent to the outlet opening and capable of being disposed in face seal engagement with the outlet opening; and,
    a rotatable retaining member slidingly disposed inside the at least one groove and capable of engaging with the valve member to cause the valve member to sealingly engage the outlet opening when the retaining member is positioned inside the at least one groove, the retaining member capable of rotating into substantial alignment with the direction of force on the user pulled lanyard.

12. The valve manifold assembly of claim 11, wherein the outlet comprises an adapter capable of removably attaching to the valve body.

13. The valve manifold assembly of claim 11, wherein the outlet comprises an integrally formed adapter leading to a breathing conduit.

14. The valve manifold assembly of claim 11, wherein the outlet opening is shaped in the form of a truncated cone.

15. The valve manifold assembly of claim 11, wherein the valve member is a solid disk.

16. The valve manifold assembly of claim 11, wherein the valve member includes a reticulated structure.

17. The valve manifold assembly of claim 11, wherein the valve member comprises a thin metal member covered by an elastomer.

18. The valve manifold assembly of claim 16, wherein the metal member is capable of alternating between a concave and a convex orientation.

19. A breathing gas delivery system, comprising:
    a mask dispensing container having an automatically releasable door;
    a valve body disposed inside the container and having an inlet connected to a source of breathing gas, the valve body having at least one outlet, the outlet having an opening disposed inside the valve body, the valve body having at least one valve member capable of engaging the outlet openings, the valve body having a at least one arcuate groove disposed adjacent to the outlet opening;
    at least one breathing conduit in fluid communication between the at least one outlet and at least one mask stowed in the container;

at least one rotatable retaining member disposed in the at least one groove in the valve body, the retaining member engaging with the valve member to cause the valve member to engage with the outlet opening, the retaining member slidingly received in the groove such that when the retaining member is removed from the groove it disengages from the valve member;

a user pulled lanyard connected to the retaining member and capable of transmitting force in a direction toward the user; and, wherein the retaining member is capable of rotating into substantial alignment with the direction of force on the user pulled lanyard such that when the door to the container opens the mask drops down such that when the user pulls the mask toward their face the tension on the lanyard pulls the retaining member from the groove such that the valve member disengages from the outlet opening enabling breathing gas to flow from the breathing source to the mask through the breathing conduit.

20. The breathing gas delivery system of claim 19, wherein the retaining member has a recessed portion facing the valve member.

21. The breathing gas delivery system of claim 19, wherein the valve member further comprises a reduced thickness section capable of deflecting toward the outlet opening when the retaining member engages the valve member.

* * * * *